United States Patent Office 3,114,602
Patented Dec. 17, 1963

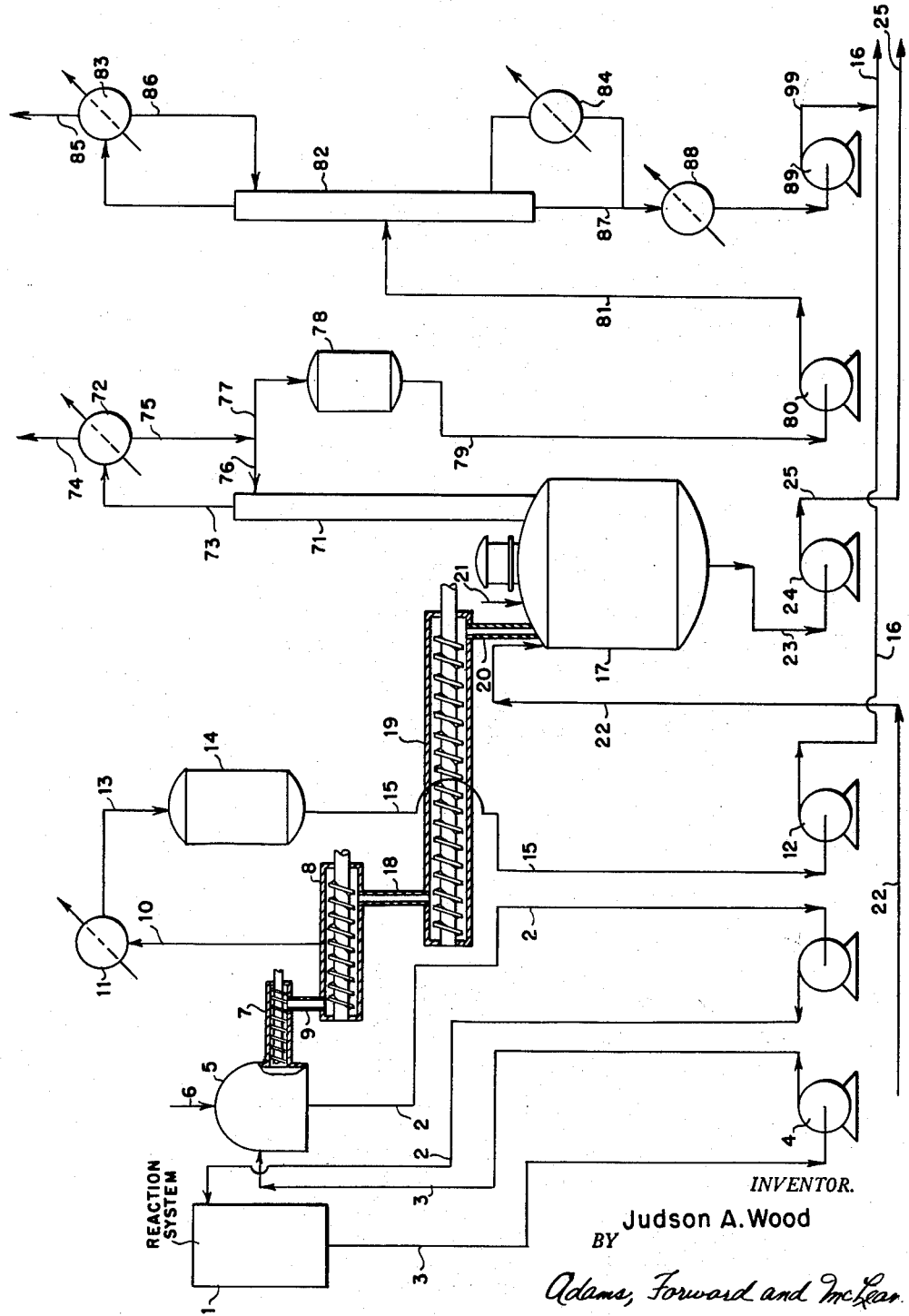

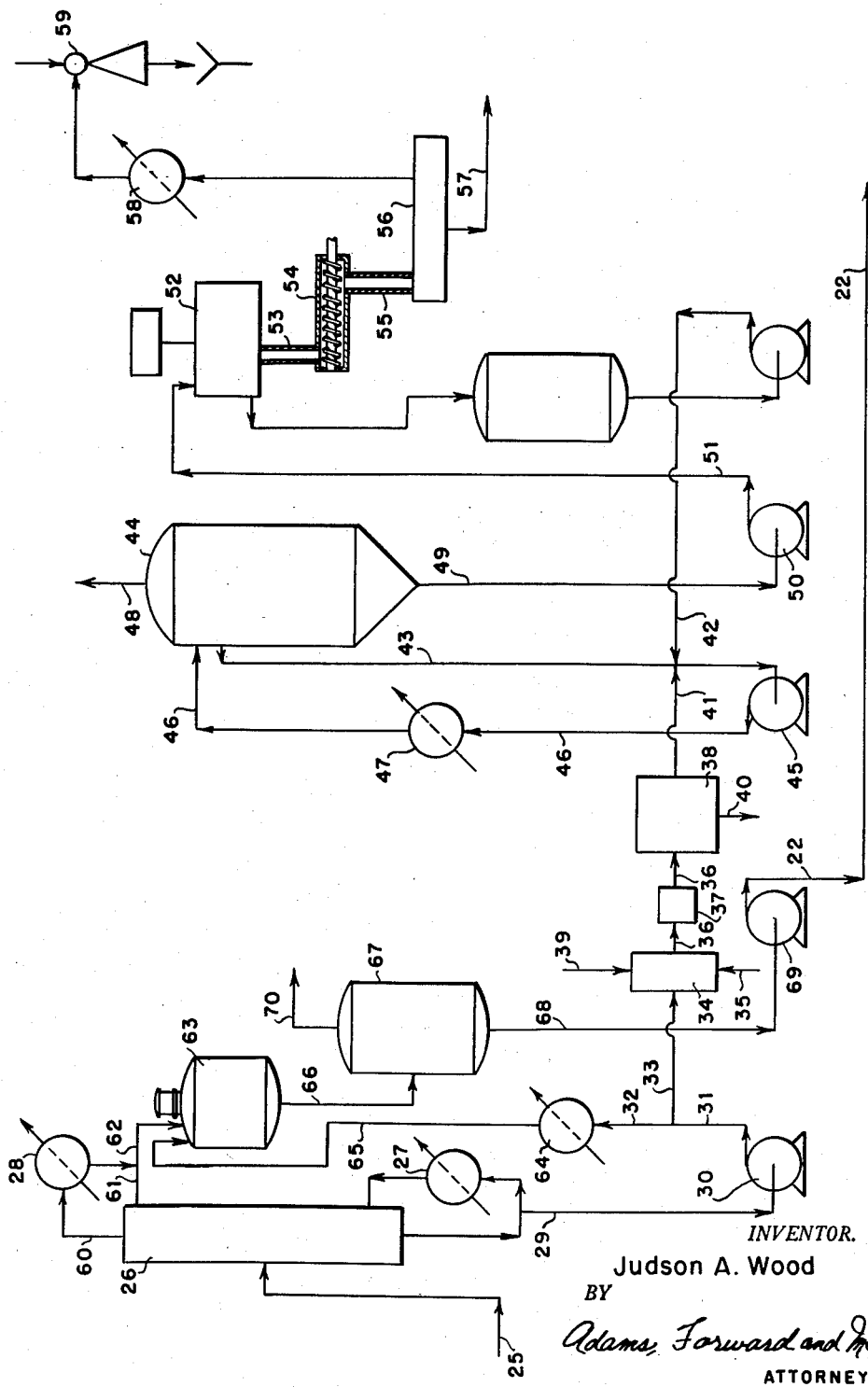

3,114,602
PURIFICATION OF LITHIUM CHLORIDE
Judson A. Wood, Niagara Falls, N.Y., assignor, by mesne assignments, to Olin Mathieson Chemical Corporation, a corporation of Virginia
Filed Oct. 10, 1956, Ser. No. 615,201
2 Claims. (Cl. 23—89)

This invention relates to a method for the purification of lithium chloride.

It has heretofore been proposed to manufacture diborane by reacting lithium hydride and boron trichloride while they are in admixture with diethyl ether. When the reaction is carried out, lithium chloride is also produced. From the standpoint of economics, it is essential that means be available for converting the lithium chloride into metallic lithium which can be reacted with hydrogen to provide further quantities of lithium hydride for use in the production of further quantities of diborane. Means are available in the art for electrolyzing lithium chloride to produce lithium metal and chlorine. However, such means require that the lithium chloride electrolyzed be highly pure.

When diborane is produced by reacting lithium hydride and boron trichloride in the presence of diethyl ether, the lithium chloride produced as a by-product is generally removed from the reaction zone slurried in the diethyl ether. This slurry contains a variety of impurities present in small percentages, among them being lithium metal present as an impurity in the lithium hydride employed, excess lithium hydride and excess boron trichloride (present as boron trichloride-diborane-diethyl etherate) not completely consumed in the reaction, diborane dissolved in the diethyl ether solvent, heavy organics of an undetermined nature and inorganics of an undetermined nature. Typically, the slurry will be composed of the following materials in the following percentages by weight: lithium metal, 0.03; lithium hydride, 0.23; lithium chloride, 2654; boron trichloride-diborane-diethyl etherate [$BCl_3 \cdot B_2H_6 \cdot (C_2H_5)_2O$], 0.23; diborane, 0.23; heavy organics of an undetermined nature, 2.13; inorganics of undetermined nature, 0.01; and diethyl ether, 70.6.

The impurities present in this slurry are dependent on the reactor operation. It is possible, therefore, under certain reaction conditions also to have lithium borohydride (present as lithium borohydride diethyl etherate) formed as an intermediate in the reaction and triethylborate present in the lithium chloride by-product stream as impurities.

It is the primary object of this invention to provide a means whereby the metallic lithium and lithium hydride and any lithium borohydride present can be converted to lithium chloride and the boron containing materials other than lithium borohydride, particularly boron trichloride-diborane-diethyl etherate, can be separated from the lithium chloride to provide lithium chloride of high purity which is adapted for use in an electrolysis operation wherein lithium chloride is converted into metallic lithium and chlorine.

This object is accomplished, in accordance with the present invention, by separating the solids from the diborane reaction slurry using liquid solid separation techniques and reacting the solvent-wet or solvent-free cake with methanol, removing the trimethylborate so formed by distillation, and then neutralizing the mixture by the addition of anhydrous chloride. Following this, other insoluble impurities can be removed by filtration, crystallizing the lithium chloride by evaporative crystallization, isolating the so produced lithium chloride crystals by solid-liquid separating techniques and drying the lithium chloride crystals under reduced pressure to produce pure, solvent free, anhydrous lithium chloride crystals. When this is done, the following reactions take place:

(1) $2Li + 2CH_3OH \rightarrow 2Li(OCH_3) + H_2$
(2) $LiH + CH_3OH \rightarrow Li(OCH_3) + H_2$
(3) $BCl_3 \cdot B_2H_6 \cdot (C_2H_5)_2O + 9CH_3OH \rightarrow$
$3B(OCH_3)_3 + (C_2H_5)_2O + 3HCl + 6H_2$
(4) $LiBH \cdot (C_2H_5)_2O + 4CH_3OH \rightarrow$
$Li(OCH_3) + B(OCH_3)_3 + (C_2H_5)_2O + 4H_2$
(5) $B(OC_2H_5)_3 + 3CH_3OH \rightarrow B(OCH_3)_3 + 3C_2H_5OH$
(6) $HCl + Li(OCH_3) \rightarrow LiCl + CH_3OH$ It will be noted that metallic lithium, lithium hydride and lithium borohydride are converted into lithium methylat which, in turn, is converted into lithium chloride. Boron trichloride and triethyl borate are converted into trimethylborate. Trimethylborate and ethyl alcohol are conveniently removed from the reaction mixture, thereby simplifying greatly the problem of providing a purified lithium chloride.

In the case where the amount of hydrogen chloride produced in Equation 3 is more than sufficient for carrying out the reaction of Equation 6, that is, more than sufficient to consume lithium methylate produced by the reactions of Equations 1, 2 and 4 to produce lithium chloride and methanol, the lithium methylate is added rather than hydrogen chloride to convert the excess hydrogen chloride to lithium chloride and methanol by the reaction of Equation 6.

In carrying out the process, sufficient methyl alcohol is introduced to convert metallic lithium, lithium hydride and any lithium borohydride (present as diethyl etherate) to lithium methylate, the convert boron trichloride and diborane present in $BCl_3 \cdot B_2H_6 \cdot (C_2H_5)_2O$ and triethyl borate to trimethyl borate and in addition enough methanol is added to dissolve all of the lithium chloride present plus a slight excess. The amounts of hydrogen chloride or lithium methylate introduced into the reaction mixture are dependent on the composition of the feed material as are shown by the equations and as was discussed above. A feed rich in unreacted lithium compounds requires the addition of hydrogen chloride while a feed rich in boron trichloride requires the addition of lithium methylate. In a highly acidic solution, pH below 5, the reaction (7) 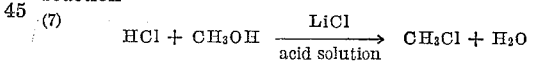

as shown in Equation 7 takes place in competition with the desired reactions and represents a loss of chlorine and introduction of water into the system. The neutralization reaction of Equation 6 can be carried out only after removal of boron-containing materials since the trimethylborate tends to interfere with that neutralization reaction. The end point for the neutralization is a pH of about 5 to 7.

The removal of the inorganic impurities is best carried out at a pH of 7 or higher since the solution of these compounds is less in the alkaline solution. Crystallization of the lithium chloride on the other hand, is best done under slightly acidic conditions (pH 5–7). The optimum neutralization point for the system is, therefore, at a pH of 7.

The following example illustrates in detail an embodiment falling within the scope of this invention and is to be considered in conjunction with the accompanying drawings.

In the drawings the numeral 1 designates a reaction system operating at about atmospheric pressure into which there are introduced, by means not shown, the following two streams: (1) a mixture of lithium hydride, diethyl ether, metallic lithium, heavy organics of an undetermined nature and inorganic impurities of an undetermined nature flowing, respectively, at the following rates in pounds per hour: 35.5; 67.6; 0.2; 0.3 and 0.1; and (2) boron trichloride flowing at the rate of 169.5 pounds per hour. There is also introduced into the reaction system, through line 2, a third stream composed of a mixture of the following materials flowing at the following rates in pounds per hour: lithium hydride, 0.5; lithium chloride, 0.5; diborane 1.6; boron trichloride-diborane-diethyl etherate, 1.6; diethyl ether 534.5 and heavy organics of an undetermined nature, 14.4. From the reaction system by means not shown, there is removed a gaseous stream having a temperature of 77° F. composed of 20 pounds per hour of diborane and 113 pounds per hour of diethyl ether. This stream can be fractionated to produce the desired diborane.

Also from the reaction system there is withdrawn through line 3 by means of pump 4 a liquid stream having a temperature of 77° F. composed of a mixture of the following materials flowing at the following rates in pounds per hour: lithium hydride, 1.6; diborane, 1.6; boron trichloride-diborane-diethyl etherate, 1.6; diethyl ether, 489.1; lithium chloride, 184; lithium, 0.2; heavy organics of an undetermined nature, 14.7; and inorganic impurities of an undetermined nature, 0.1. This liquid stream is transferred to continuous pressure filter 5 where the solids are separated and washed with 91.4 pounds per hour of diethyl ether introduced through line 6. From this filter there is withdrawn, by means of conveyor 7, a stream composed of a mixture of the following materials flowing at the following rates in pounds per hour: lithium hydride, 1.1; diethyl ether, 46; lithium chloride, 183.5; lithium, 0.2; heavy organics of an undetermined nature, 0.3; inorganic impurities of an undetermined nature, 0.1; and traces of diborane and boron trichloride-diborane-diethyl etherate. This material is transferred to coke drier 8 by means of chute 9 where 45 pounds per hour of diethyl ether containing traces of diborane is removed through line 10, is condensed in condenser 11 and is transferred to clean ether storage by means of pump 12 through line 13, tank 14 and lines 15 and 16. The dried material is transferred to agitated treatment tank 17 by means of chute 18, conveyor 19 and chute 20 and is a mixture of the following materials flowing at the following rates in pounds per hour: lithium hydride, 1.1; diethyl ether, 1.0; lithium chloride, 183.5; lithium, 0.2; heavy organics of an undetermined nature, 0.3; inorganic impurities of an undetermined nature, 0.1 and traces of boron trichloride-diborane-diethyl etherate.

Also into tank 17 there are introduced streams 21 and 22. Stream 21 is pure methanol flowing at the rate of 580 pounds per hour and stream 22 is composed of 1.6 pounds per hour of lithium chloride, 5 pounds per hour of methanol, and 0.6 pounds per hour of trimethyl borate. Tank 17 is operated at a temperature of approximately 100° F.

From the bottom of tank 17 through line 23 there is withdrawn a mixture composed of the following materials flowing at the following rates in pounds per hour: lithium chloride, 185.1; lithium methylate, 6.4; heavy organics, 0.3; methanol, 578.6; trimethyl borate, 0.7 and inorganic impurities, 0.1. This stream is transferred by means of methanol solution pump 24 and line 25 into trimethyl borate still 26 provided with reboiler 27 and condenser 28. From the bottom of the still through line 29 there is withdrawn as net liquid product a mixture of the following materials flowing at the following rates in pounds per hour: lithium chloride, 185.1; lithium methylate, 6.4; heavy organics, 0.3; methanol, 578.4; and inorganic impurities, 0.1. This stream has a temperature of approximately 149° F. It is transferred by means of bottoms pump 30 and line 31 and the stream is then split into streams 32 and 33. Stream 32 is composed of the following materials flowing at the following rates in pounds per hour: lithium chloride, 1.6; and methanol, 4.8.

Stream 33 is composed of a mixture of the following materials flowing at the following rates in pounds per hour: lithium chloride, 183.5; lithium methylate, 6.4; heavy organics, 0.3; methanol, 573.6; and inorganic impurities, 0.1 which is transferred to line mixer 34 where anhydrous hydrogen chloride is added through line 35 at a rate of 6.2 pounds per hour. Line 36 transfers material from the line mixer 34 through pH cell 37 and on to filter 38 and transfers a mixture of the following materials flowing at the following rates in pounds per hour: lithium chloride, 190.7; methanol, 579; heavy organics, 0.3; and inorganic impurities, 0.1. The addition of hydrogen chloride through line 35 (alternately lithium methylate as explained above, depending upon operating conditions) in methanol solution through line 39 is controlled by the pH measurement made in pH cell 37 to maintain pH at 7.0.

From filter 38 there is withdrawn through line 40 a mixture composed of the following materials flowing at the following rates in pounds per hour: inorganic impurities, 0.1; heavy organics, 0.1. From filter 38 there is also withdrawn through line 41 a stream composed of the following materials flowing at the following rates in pounds per hour: lithium chloride, 190.7; methanol, 579; and heavy organics, 0.2. The stream flowing through 41 is admixed with stream 42 which has a temperature of approximately 176° F. and which is composed of a mixture of the following materials flowing at the following rates in pounds per hour: lithium chloride, 53; and methanol, 137. Streams flowing in lines 41 and 42 are also admixed with stream 43 which is a circulating side stream withdrawn from salt crystallizer 44. Stream 43 is transferred by means of crystallizer pump 45 and thence through line 46 and heat exchanger 47 into an upper section of the salt crystallizer. From the top of the salt crystallizer by means of line 48 there is withdrawn to a condensing and collection system not shown a vapor stream of 560 pounds per hour of methanol.

From the bottom of the salt crystallizer there is withdrawn stream 49 having a temperature of approximately 176° F. and which is a slurry composed of the following materials flowing at the following rates in pounds per hour: lithium chloride, 243.7; methanol, 156; and heavy organics, 0.2. This stream is transferred by means of slurry transfer pump 50 and line 51 into motor driven salt slurry centrifuge 52, from which there is withdrawn through chute 53 a salt slurry composed of the following materials flowing at the following rates in pounds per hour: lithium chloride, 190.7; methanol, 19; and heavy organics, 0.2. This slurry is transferred by conveyor 54 and chute 55 to vacuum salt drier 56 wherein methanol and a portion of the heavy organics are driven off by heating to a temperature of 300° F. and at an absolute pressure of 5 inches of mercury. Purified lithium chloride is withdrawn from the drier through line 57 at the rate of 190.7 pounds per hour. Methanol vaporized in the salt drier 56 is condensed in condenser 58 to provide liquid methanol suitable for use in the process of this invention. Pressure is maintained in vacuum drier 56 and condenser 58 by means of steam ejector 59.

Returning to the operation of trimethylborate still 26, there is removed overhead therefrom through line 60 a vapor stream which is a mixture of methanol and trimethyl borate. This stream is condensed in condenser 28 and liquid reflux returned to the column through line 61. Through line 62 and into azeotrope mixer 63 there passes a mixture of methanol flowing at the rate of 0.2 pound per hour and trimethyl borate flowing at the rate of 0.7 pound per hour. This mixer has a temperature of approximately 77° F. Also returning again to stream 32, that stream passes through cooler 64 wherein the temperature of the stream is reduced to approximately 77° F. From cooler 64 the stream is introduced into mixer 63 by means of line 65. In mixer 63 overhead trimethyl borate from still 26 is mixed with sufficient bottoms product from still 26 to provide a minimum concentration of 7 percent by weight lithium chloride in the total mixture. The lithium chloride serves to break the trimethylborate methanol azeotrope. From mixer 63 and through line 66 there passes a mixture of the following materials flowing at the following rates in pounds per hour: lithium chloride, 1.6; methanol, 5.0; and trimethylborate, 0.7. From the bottom of decanter 67 there is withdrawn stream 68 which is transferred by means of pump 69 into line 22, already described. From the top of decanter 67 there is withdrawn through line 70 a stream of essentially pure trimethylborate flowing at the rate of 0.1 pound per hour. This stream is of sufficient purity for further use where desired.

Referring again to the operation of tank 17, it will be noted that it has associated therewith ether still 71 provided with ether condenser 72. Vapors pass overhead from still 71 through line 73 and into condenser 72, overhead from which through line 74 there is withdrawn hydrogen gas flowing at the rate of 0.2 pound per hour. Liquid condensed in condenser 72 passes downwardly through line 75, reflux to still 71 passing through line 76 and the remainder of stream 75 passing through line 77 into ether storage tank 78. Through line 77 there flows diethyl ether at the rate of 1 pound per hour in admixture with a trace of methyl chloride. From tank 78 this mixture passes through line 79 and by means of pump 80 and line 81 is transferred into ether purification still 82 provided with methyl chloride vent condenser 83 and reboiler 84. Overhead from condenser 83 through line 85 there is withdrawn a trace of methyl chloride vapor, reflux being returned to the column by means of line 86. From the bottom of still 82 through line 87 there is withdrawn a stream of essentially pure diethyl ether flowing at the rate of 1 pound per hour and having a temperature of approximately 95° F. This stream is passed through cooler 88 and transferred by pump 89 and lines 90 and 16 to storage for further use.

As will be appreciated, various modifications can be made in the specific operation just described to provide other embodiments which fall within the scope of this invention. In general, the lithium chloride slurry emanating from the diborane production system and subsequently filtered and treated with methanol and hydrogen chloride or lithium methylate in accordance with the present process will contain approximately 60–85 percent by weight of lithium chloride with the remainder being diethyl ether, except for metallic lithium, lithium hydride and boron trichloride-diborane-diethyl etherate and any lithium borohydride-diethyl etherate and triethyl borate and other impurities. The slurry will generally contain up to about 0.1 weight percent of metallic lithium, up to about 1.0 weight percent of lithium hydride, up to about 3.5 weight percent of lithium borohydride (calculated as diethyl etherate), up to about 0.5 weight percent of boron trichloride (calculated as diborane-diethyl etherate) and up to about 0.5 weight per cent of triethylborate. Usually the reaction between the filtered slurry and methanol and with hydrogen chloride or the lithium methylate solution will be conducted at a temperature within the approximate range of 75° F. to 175° F.

I claim:

1. In a process wherein boron trichloride and lithium hydride are reacted in admixture with diethyl ether to produce diborane and a slurry of solids including lithium chloride in diethyl ether, said slurry also containing as impurities lithium metal, lithium hydride and boron trichloride-diborane-diethyl etherate, the steps of separating the solids from said slurry and admixing them with methanol in amount at least sufficient to convert the lithium metal and lithium hydride present in said solids to lithium methylate and hydrogen, to convert the boron trichloride-diborane-diethyl etherate present in said solids to trimethyl borate, diethyl ether, hydrogen chloride and hydrogen and to dissolve the lithium chloride present in said solids, distilling the reaction mixture to remove trimethyl borate overhead to leave remaining a reaction mixture containing one of the compounds hydrogen chloride and lithium methylate in greater molar amount than the other, admixing the reaction mixture at a pH of from about 5 to about 7 with one of the compounds hydrogen chloride and lithium methylate in amount such that the hydrogen chloride and lithium methylate are present in the reaction mixture in substantially equimolar amounts whereby hydrogen chloride and lithium methylate present in the entire reaction mixture react to form lithium chloride and methanol, separating solids from the reaction mixture to leave remaining a solution of purified lithium chloride in methanol, and separating lithium chloride from said solution.

2. The process of claim 1 wherein the reaction with methanol and the reaction between hydrogen chloride and lithium methylate are conducted at a temperature within the approximate range 75° F. to 175° F.

No References Cited.